United States Patent [19]

Jelks

[11] Patent Number: 4,828,573

[45] Date of Patent: May 9, 1989

[54] METHOD OF MANUFACTURING A PELLETIZED FUEL

[75] Inventor: James W. Jelks, Sand Springs, Okla.

[73] Assignee: Technology Research & Development, Inc., Oklahoma City, Okla.

[21] Appl. No.: 37,433

[22] Filed: Apr. 13, 1987

[51] Int. Cl.$^4$ .......................... C10L 5/14; C10L 5/12; C10L 5/06

[52] U.S. Cl. .................. 44/15 B; 44/15 D; 44/16 C; 44/598; 44/905

[58] Field of Search .................. 44/15 B, 15 C, 15 D, 44/16 C, 598, 593, 501, 905

[56] References Cited

U.S. PATENT DOCUMENTS

| | | | |
|---|---|---|---|
| 3,684,465 | 8/1972 | Hsu | 44/598 |
| 3,939,286 | 2/1976 | Jelks | 426/312 |
| 4,230,460 | 10/1980 | Maust, Jr. | 44/16 C |
| 4,395,265 | 7/1983 | Reilly et al. | 44/15 R |
| 4,494,962 | 1/1985 | Christie et al. | 44/15 D |

FOREIGN PATENT DOCUMENTS

| | | | |
|---|---|---|---|
| 1045977 | 12/1958 | Fed. Rep. of Germany | 44/15 B |
| 3170 | 12/1864 | United Kingdom | 44/16 C |
| 18839 | 12/1901 | United Kingdom | 44/15 C |

Primary Examiner—Carl F. Dees
Attorney, Agent, or Firm—Head & Johnson

[57] ABSTRACT

A method of manufacturing a pelletized fuel including the steps of hydrolizing cellulose containing material to form a binder, mixing the binder with combustible fines including preferably coal fines and wood chips or saw dust in which the binder is about two percent to eight percent by weight of the mixture, and forming the mixture into pellets. The pellets are dried by subjecting them to a temperature sufficient to drive off substantially the water content thereof to provide pellets which are crush resistant and weather resistant and which may thereby by handled for use as a fuel such as in a boiler for generating steam.

6 Claims, 1 Drawing Sheet

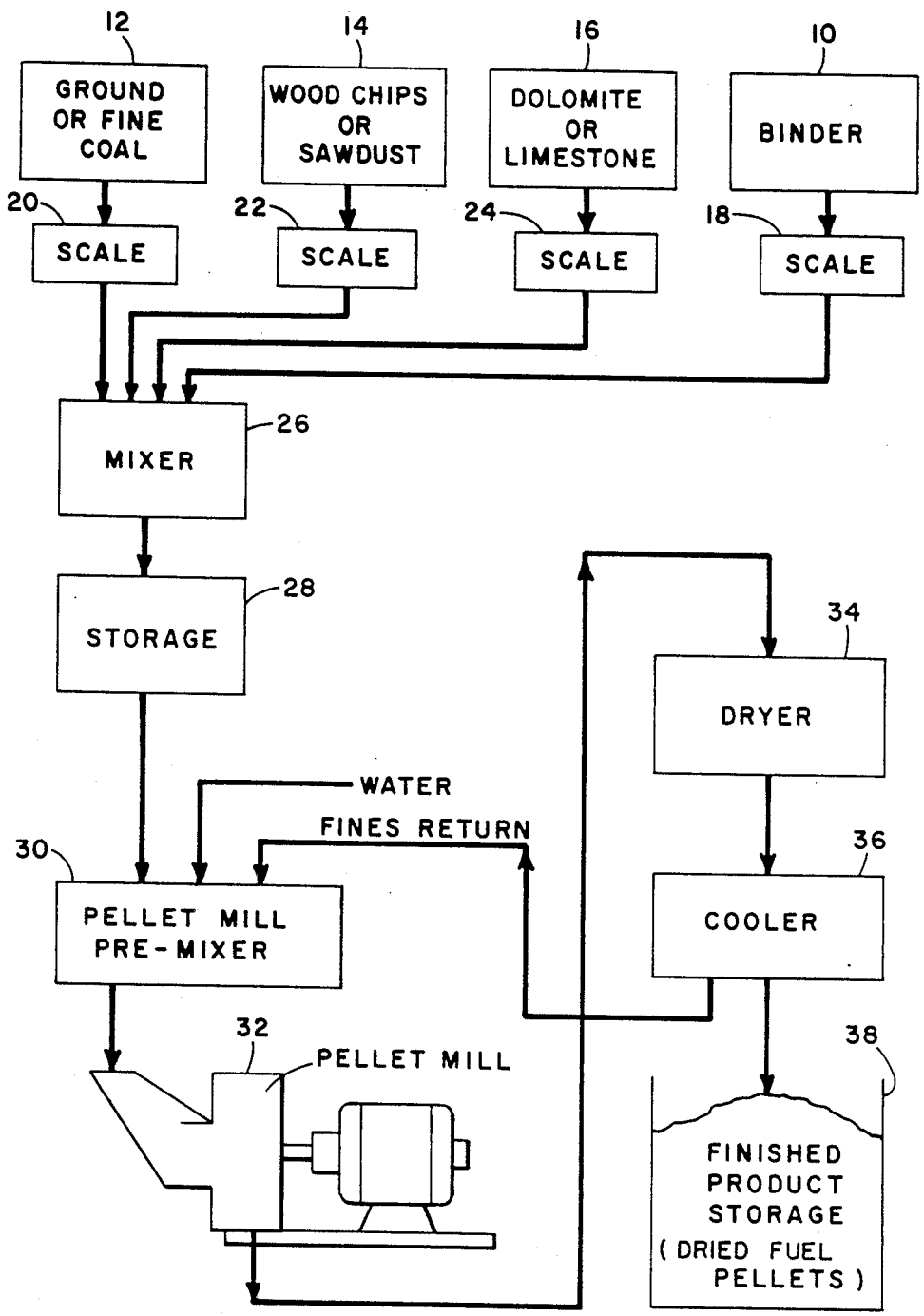

METHOD OF MANUFACTURING A PELLETIZED FUEL

SUMMARY OF THE INVENTION

The coal beds in the United States and many other areas of the world contain billions of tons of coal reserves, but because of the high sulphur content, marketing opportunities as a boiler fuel are limited. At the same time there are many sawmills which produce large quantities of sawdust and other wood wastes. Most of this large, renewable wood waste resource is not used in any by-product recovery operation and is available for utilization as a fuel source.

This invention is directed towards the production of coal-wood-limestone pellets for use as an industrial fuel source. Waste coal fines from secondary coal recovery operations can be used in the pellets. An inexpensive material made from hydrolized wood waste is used as the binder to form the pellets. The addition of waste wood to certain high sulphur coal fines has the advantage of lowering the sulphur content of the fuel pellets to make them more marketable. By also adding limestone to the pellet, $SO_2$ emissions are greatly reduced by trapping 80–95 percent of the sulphur in the ash. A synergistic sulphur removal effect is attained from the use of both limestone and the alkali available in wood ash.

In the United States and other countries of the world large deposits of coal exists, much of which is unuseable as a fuel under present conditions. Coal may be unuseable because of its chemical composition, that is, primarily because it is too high in sulphur so that the sulphur content of the gases of combustion exceed pollution requirements. Other coal is not used because of its physical nature, that is, it exists as coal fines as a result of mining, transporting and handling coal in which a substantial percent is formed into dust which can not be employed with normal coal handling equipment and which ends up in wash plant tailing ponds. Further, a source of fuel which is substantially untapped for industrial use is that of wood products. While wood is frequently used for home heating, it is seldom employed in industrial plants such as for generating electricity primarily because of the relatively low BTU per pound.

The present invention is directed towards a method of making use of these three, hither to, substantially untapped fuel sources, that is, coal fines, coal high in sulphur content, and wood.

The present invention provides a method of manufacturing pelletized fuel employing the ingredients of coal fines, ground coal which may be high in sulphur content and wood, such as in the form of wood chips or saw dust, and mixtures of these. The invention includes preparing a binder by hydrolyzing cellulose containing material. The binder is formed by subjecting mixtures of water, cellulose containing material and an acid catalyzt and subjecting the mixture to elevated temperatures and pressures until at least a portion of the cellulosic material is converted to saccharides and saccharide acids. This binder is then mixed with combustible fines such as coal fines, ground coal which may be higher in sulphur content than would normally permit its direct combustion as an industrial fuel, and ground wood, including sawdust. This mixture is then pelletized and the green pellets obtained from such process are cured by heating to a relatively high temperature of about 165° C., or at a temperature which slightly scorches the pellets. The cured pellets have crush strength and weather resistance which makes them available for use as a fuel in industrial applications such as in boilers for generating heat and in power plants, the pellets being useable in standard stoking equipment.

For background information as to the preparation of a binder reference may be had to U.S. Pat. Nos. 3,939,286, 4,053,645 and 4,125,063 issued to J. W. Jelks. Prior issued patents which relate to pelletized fuel are U.S. Pat. Nos. 4,015,951; 4,398,917; and 4,395,265.

A better understanding of the invention will be had by reference to the following description and claims, taken in conjunction with the attached drawing.

DESCRIPTION OF THE DRAWING

The drawing is a schematic of a method of practicing the invention in block diagram form.

DESCRIPTION OF THE PREFERRED EMBODIMENT OF THE INVENTION

Referring to the drawing, a method is shown for manufacturing pelletized fuel in which the raw materials used consist of ground or fine coal, wood chips or sawdust, ground dolomite or ground limestone and a binder formed of hydrolyzed cellulosic material. The binder which is formed in the process equipment indicated by the block 10 is manufactured by combining organic matter, such as wood chips, sawdust, straw, corn cobs, rice hulls, and similar cellulosic containing materials with water and an acid catalyst. The acid catalyst may be such as carbonic acid, sulphuric acid, phosphoric acid, hydrochloric acid, acetic acid and the like and may be either toxic or nontoxic acid. The mixture is then subjected to an elevated oxygen partial pressure at an elevated temperature to effect an exothermic reaction of oxygen with the cellulose so that at least a portion of the lignin-cellulose bonds of the cellulosic material particles are broken and at least part of the cellulose molecules are fragmented. The step of hydrolyzation is continued for a sufficient length of time at an elevated temperature and pressure of at least about 135° C. to about 150° C. under saturated steam conditions to convert at least a portion of the cellulosic material into saccharides and saccharide acids.

The source of combustible fines from source 12 provides the basic caloric content of the fuel. The combustible fines are formed from a combination of ground coal or coal fines from source 12 and from wood material such as wood chips or sawdust from source 14. The wood particles from source 14 should preferably be less than about 35 mesh. The coal fines should be preferably less than 50 mesh. When the ground coal or coal fines from source 12 include a sulphur content which would make the resultant fuel produce a sulphur discharge in the exhaust combustion gases above the prescribed environmental limitations the fuel can be made to meet such limitations by the addition of a sulphur neutralizing ingredient from source 16. This is preferably ground limestone or ground dolomite. The raw materials from sources 10 through 16 are carefully measured by use of scales 18 through 24 and the selected ratio of the ingredients is passed to a mixer 26 wherein the ingredients are thoroughly blended. From the mixer 26 they pass to storage 28 and from thence to a pellet mill premixer 30 wherein the mixture is combined with steam and water. From the premixer the material is passed to a pellet mill 32 where the mixture is formed into discrete pellets.

These pellets, which are referred to as "green pellets", are cured in an oven 34 at a temperature of about 165° or at a temperature which slightly scorches the pellets. The curing step is important in that it changes the pellets into a condition which permits their handling in the normal way in which coal is normally handled as a fuel; that is, the pellets have minimum crush resistance and minimum weather resistance characteristics.

From the curing oven 36 the pellets are passed to a cooler wherein the temperature is reduced such as to prevent the possibility of spontaneous combustion and the cool pellets are moved to a finished storage area 38 wherein they may be used as a fuel in industrial and power generating applications in the same way that coal is typically employed by use of a stoker. Any fines which are produced as a result of the handling of the pellets during cooling are returned to the pellet mill premixer 30 as indicated.

Extensive tests of the method of this invention have been conducted by Techrad Analytical Laboratories of Oklahoma City, Okla. under the direction of Dr. Earnest L. Koerner.

Results from tests of pellets showed that two to five percent binder provides pellets with mechanical strength, durability, and weatherability to withstand handling. Pellets need to have wood particles less than 35 mesh and should be cured to the stage of being slightly scorched to exhibit acceptable weatherability.

To test the efficacy of the invention a binder was prepared according to the U.S. Pat. Nos. 3,939,286; 4,053,645 and 4,125,063, to J. W. Jelks, which teach hydrolyzing cellulose into starches, sugars and saccharide acids. Hardwood sawdust was ground to past 35 mesh to increase the surface area of the particles. The ground particles were mixed in a 1:1.2 ratio with an acid solution containing 3.50 percent nitric acid, 0.02 percent iron and the remainder water. The mixture with a pH of 2.5 was charged into a stainless steel pressure vessel equipped with a pressure gauge. The mixture was then heated until a specified pressure developed in the vessel, typically 150 psig, and the pressure was maintained for one hour and 15 minutes. The hydrolyzed mixture was removed from the vessel, air dried overnight, and later used as a binder for the test pellets.

Samples of coal were pulverized in a hammermill and screened to yield fractions of $-20+35$, $-35+50$, and $-50+100$ mesh. Homogeneous samples were obtained by riffle blending. Sawdust was screened to yield particles less than 10 mesh. Some sawdust was pulverized in a hammermill and screened to obtain a fraction passing 35 mesh for use in manufacturing the binder.

A series of test pellets were prepared using coal/wood ratios of 80/20, 65/35, and 50/50, and three coal mesh sizes of $-20+35$, $-35+50$, and $-50+100$. The sulphur content of one coal used was 1.96 percent. Wood particle size was less than 10 mesh. Limestone used in the pellets corresponded to a calcium-to-sulphur molar ratio of either 1.0 or 3.0.

For coal pellets to be commercially feasible, it is essential to minimize the content of any binder in the pellet, since the binder and its production add major expense to the pellet cost. A pellet must have enough binder to provide mechanical strength, durability, and weatherability to withstand handling. A series of experiments were run to determine the minimum binder requirement for all test mixes. An empirical experimental technique was used in which the outside limits of the coal size and coal/wood ratio were tested with varying amounts of binder. These test pellets were evaluated using the tests of compressive strength, pellet durability index and weatherability.

The binder concentration was varied from two to 15 percent of the wood and coal. The ratio of coal to wood was varied from a 50/50 mixture to an 80/20 mixture. One coal size, $-20+35$ mesh, was used for nine batches. The nine batches were tested for durability, strength, and weatherability.

The results of the durability tests indicate that there is little difference between the durability of the pellets regardless of binder concentration or coal to wood ratio until only two percent binder was used. At this level a slight drop in pellet durability occurred. A durability index of 50-60 is desirable. The durability results indicate that green pellets made from as low as two percent binder are durable enough to withstand handling.

In commercial practice, pelleted materials, such as fertilizers are satisfactory with pellet strengths of 15-20 pounds. Therefore, the compressive strength tests also suggests that green pellets with as low as two percent binder are durable enough to withstand handling.

Comparison of the effects of coal particle size and binder concentraion on strength and durability on green pellets produced the following results:

| Percent Binder | Coal Mesh | Durability | | Strength | |
|---|---|---|---|---|---|
| | | $-20+35$ | $-50+100$ | $-20+35$ | $-50+100$ |
| 15 | | 99 | 98 | 64 | 34 |
| 8.5 | | 97 | 99 | 37 | 30 |
| 2 | | 95 | 99 | 27 | 28 |

Pellets with equal binder content and constant coal to wood ratios (but different mesh coal) showed equal durability; however, the pellet strengths of the $-50+100$ mesh coal were less than the similar pellets with larger sized particles. The difference in strength was almost twice as much with 15 percent binder, 23 percent greater with 8.5 percent binder, and the same with two percent binder. These results indicate that acceptable green pellets can be made from $-50+100$ mesh coal fines with as little as two percent binder.

Green pellets contained 15-20 percent moisture and were air dried to about 5 percent moisture by setting in the laboratory for several days. Pellets were cured by heating in a laboratory oven for various times and at various temperatures. These drying tests indicate that the strongest cured pellets were obtained after heating to about 165± C. and slightly scorching the pellets.

All pellets in this test, (cured or green) containing wood particles less than 10 mesh, failed the weatherability test regardless of binder concentration. This led to a second series of test pellets. Nine batches of pellets were tested including a control with 80/20 coal to wood ratio and wood less than 10 mesh, an 80/20 pellet with wood less than 50 mesh, and a coal pellet with no wood. The binder concentration was varied at 8.5, 5 and 2 percent. Results indicated that only after being cured at 165° C. did any of the pellets exhibit acceptable weatherability. The control batch exhibited unacceptable weatherability, but the 80/20 mixture with wood less than 50 mesh and the coal pellet passed the weatherability test.

The concept of burning coal with limestone and converting the sulphur in the coal to calcium sulfate has proven successful for many types of coal burning systems. Tests have shown that by adding limestone to the bed in a fluidized bed combustion broiler, as much as 98% of the sulphur in the coal is absorbed.

The objective of this part of the investigation was to take the proven technology a step further and demonstrate the synergistic sulphur removal effects of limestone and the alkali in wood ash. It was also desired to investigate the effects of coal particle size and of calcium/sulphur ratios with various levels of sulphur in coals on the sulphur removal efficiency in coal pellets.

Tests of pellets made with various calcium/sulphur ratios, coal/wood ratios and coal particle sizes show sulphur capture in the ash between 11 and 100 percent. Increasing sulphur-removal efficiency was due to higher calcium/sulphur ratios, lower coal/wood ratios, and finer coal particles. The average percent sulphur capture of pellets made from three coal sizes for three ratios of coal to wood and three levels of limestone was as follows:

|          | Percent Sulphur Capture |    |    |
|----------|-------------------------|----|----|
| Coal/Wood Ca/S | 0 | 1 | 3 |
| 80/20    | 11 | 51 | 78 |
| 65/35    | 32 | 70 | 77 |
| 50/50    | 37 | 68 | 87 |

At each coal/wood ratio the percent sulphur capture increased as the calcium/sulphur ratio increased.

The percent sulphur capture also increased as the ratio of wood/coal increased for the 20/80 pellet to the 50/50 pellet at each of the three levels of limestone. Pellets with the same components but finer sized coal particles trapped more sulphur.

Data from sulphur emission tests generally agreed with the results calculated from the sulphur trapped in the ash. The reproducability of the sulphur capture in the emissions was not nearly as good as that in the ash but the data showed that more sulphur was trapped with a calcium/sulphur ratio of 3 than a calcium/sulphur ratio of 1. More sulphur was trapped in the ash when more wood was present in the pellet under the conditions of the same calcium/sulphur ratio.

The sulphur testing confirmed the synergistic sulphur removal effects from limestone and the alkali in the wood ash. The data showed that finer coal particles increased the sulphur removal efficiency. Increasing the calcium/sulphur ratio also increased the sulphur removal efficiency.

Tests indicate that sulphur capture is affected by the type of coal. One theory is that the type and quantity of minerals in the coal affect the $CaSO_2$ formation and thus affect sulphur capture.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. The method of manufacturing a pelletized fuel comprising:
    (1) hydrolyzing cellulose containing material to produce a binder;
    (2) mixing the binder of step (1) with combustible fines in which the binder is about 2% to about 8% by weight of the mixture;
    (3) forming the mixture in step (2) into pellets which may be burned as a fuel; and
    (4) curing the pellets from step (3) by subjecting the pellets to an elevated temperature of about 165° C. in an environment wherein the pressure is not substantially greater than atmospheric pressure.

2. The method of manufacturing a fuel according to claim 1 wherein the step of hydrolyzing cellulose material includes subjecting a mixture of cellulose containing material, water and an acid catalyst to heat and pressure until at least a portion of the cellulose is covered to saccharides or saccharide acids.

3. The method of manufacturing a fuel according to claim 1 wherein the combustible fines include an inherent sulphur content and step (2) includes adding a calcium containing material to the mixture in a ratio wherein the molar weight of the calcium is about equal to the molar weight of sulphur inherent in the combustible fines.

4. The method of manufacturing a fuel according to claim 3 wherein the calcium containing material is selected from the group consisting of ground limestone and ground dolomite.

5. The method of manufacturing a fuel according to claim 1 wherein said pellets are heated to a temperature to slightly scorch the pellets.

6. The method of manufacturing a fuel according to claim 1 wherein the combustible fines are selected from the group consisting of coal fines, ground coal, wood chips, sawdust and mixtures thereof.

* * * * *

UNITED STATES PATENT AND TRADEMARK OFFICE
CERTIFICATE OF CORRECTION

PATENT NO. : 4,828,573

DATED : May 9, 1989

INVENTOR(S) : JAMES W. JELKS

It is certified that error appears in the above-identified patent and that said Letters Patent is hereby corrected as shown below:

Title page:

(73) Assignee: TECHRAD Technology Research & Development, Inc., Oklahoma City, Oklahoma. (part interest)

Signed and Sealed this

Second Day of October, 1990

Attest:

HARRY F. MANBECK, JR.

*Attesting Officer*　　　　*Commissioner of Patents and Trademarks*